US006723920B2

(12) United States Patent
Higuchi et al.

(10) Patent No.: US 6,723,920 B2
(45) Date of Patent: Apr. 20, 2004

(54) FUSE BOX MOUNTING STRUCTURE

(75) Inventors: Eiji Higuchi, Yokkaichi (JP); Yoshihisa Shimada, Yokkaichi (JP)

(73) Assignee: Sumitomo Wiring Systems, Ltd., Mie (JP)

( * ) Notice: Subject to any disclaimer, the term of this patent is extended or adjusted under 35 U.S.C. 154(b) by 0 days.

(21) Appl. No.: 10/615,019

(22) Filed: Jul. 9, 2003

(65) Prior Publication Data

US 2004/0007375 A1 Jan. 15, 2004

(30) Foreign Application Priority Data

Jul. 9, 2002 (JP) ....................................... 2002-200332

(51) Int. Cl.[7] .................................................. H02G 3/08

(52) U.S. Cl. ............................. 174/50; 174/58; 174/59; 220/4.02; 439/535; 439/522; 439/621; 248/906

(58) Field of Search ............................. 174/50, 59, 58, 174/63, 138 F; 220/3.2, 4.02; 439/535, 522, 621, 763; 248/906; 29/65

(56) References Cited

U.S. PATENT DOCUMENTS 4,698,459 A * 10/1987 Drake .................... 174/138 F
5,516,601 A * 5/1996 Caroseli et al. ............... 429/65
5,645,448 A 7/1997 Hill
6,090,502 A * 7/2000 Ingram et al. ................ 429/65
6,462,270 B1 * 10/2002 Depp et al. .................... 174/50
6,548,755 B2 * 4/2003 Wu ............................. 174/50
6,563,048 B2 * 5/2003 Holt et al. ..................... 174/50
6,583,353 B2 * 6/2003 Murakoshi et al. ........... 174/50

* cited by examiner

*Primary Examiner*—Dhiru R Patel
(74) *Attorney, Agent, or Firm*—Oliff & Berridge, PLC

(57) ABSTRACT

A fuse box is placed on an upper surface of a battery box through a supporting plate. Through-holes into which battery posts are inserted are formed at predetermined positions of the supporting plate. A positioning emboss portion is projected from the supporting plate. A fit-on portion is formed at a position corresponding to the emboss portion of the supporting plate of the fuse box. The fuse box is mounted on an upper surface of the supporting plate, with the battery posts in penetration through the through-holes of the supporting plate. A circular arc portion of a battery terminal is fixedly fitted on the battery post. The emboss portion is fitted on the fit-on portion.

10 Claims, 6 Drawing Sheets

FUSE BOX MOUNTING STRUCTURE

BACKGROUND OF THE INVENTION

1. Field of Invention

The present invention relates to a fuse box mounting structure, such as to stably fix the fuse box to an upper portion of a battery of a vehicle.

2. Description of Related Art

FIG. 6 shows a conventional fuse to be connected to a battery of a vehicle. A battery terminal 3 is connected to an end of a lead wire 4. The lead wire 4 is connected to a battery post 2 that projects from the upper surface of a battery 1 by fitting the battery terminal 3 on the battery post 2. The lead wire 4 is wired to a fuse box 5 to connect the lead wire 4 to a fuse (not shown) accommodated inside the fuse box 5.

However, in the case where a battery box 1 and a fuse box 5 are spaced distant from one another, they are connected to each other with a lead wire 4. Space for installing the fuse box 5 is additionally required. Further, when the lead wire is damaged, fusing may occur at an upstream side of the fuse.

Since the battery post 2 is approximately cylindrical, the contact portion of the battery terminal 3 disposed at the end of the lead wire 4 is also circular and the battery terminal 3 is fixedly fitted on the battery post 2. This may cause the battery terminal 3 to rotate around the battery post 2 and the lead wire to be disposed in a wrong direction. As such, the conventional art causes the operability of mounting the fuse box on a vehicle to be low.

SUMMARY OF THE INVENTION

The present invention has been made in view of the above-described problem. Accordingly, it is an object of the present invention to connect a battery fuse to a battery post without the intermediary lead wire, to accomplish space-saving and improve reliability on the electrical connection and prevent rotation of a battery terminal so that the fuse box does not turn in a wrong direction and to thereby mount the fuse box on a vehicle body with high operability.

To achieve the object, according to a first embodiment of the invention, there is provided a fuse box mounting structure for electrically connecting a battery terminal fixed to a battery post, which projects from an upper surface of a battery, to a fuse accommodated inside a fuse box which is mounted on the battery.

With this, a flat supporting plate formed by molding an insulating resin is interposed between the fuse box and the upper surface of the battery. Also, a pair of through-holes are formed on the supporting plate to insert the battery post therein. Finally, a positioning emboss portion is projected from the supporting plate to fit the emboss portion on a fit-on portion formed on a bottom wall of a case of the fuse box.

A circular arc portion of the battery terminal may be fixedly fitted on the battery post to thereby support non-rotatably the fuse box on the battery. This is accomplished by fixing the battery terminal to the battery post and by fixing the emboss portion to the fit-on portion of the bottom wall of the case of the fuse box.

Because the fuse box is directly installed on the battery box, it is possible to reduce the space needed for installing the fuse box, compared to the space for installing the fuse box required in the conventional art. Thus, it is possible to effectively utilize a limited wiring space in a vehicle body. By electrically connecting the battery fuse inside the fuse box and the battery post to each other, the circular arc portion of the battery terminal is fitted on the battery post not through the lead wire, but through the battery terminal. Thus, it is possible to also improve reliability of the electric connection.

The emboss portion of the supporting plate, through which the positive and negative battery posts have penetrated, is fitted on a fit-on portion that is formed on the case of the fuse box. Thereby the fuse box is placed in position by fixing the positive battery post to the circular arc portion of the battery terminal and by fixing the emboss portion of the supporting plate to the fit-on portion. Therefore, it is possible to prevent the fuse box from rotating on the positive battery post and turning to a wrong direction.

Accordingly, the fuse box can be mounted on a vehicle body with high operability, and the electric wires extending from the fuse box can be connected to apparatuses with high operability.

The battery terminal is connected to the fuse housed within the fuse box. Therefore, the case of the fuse box is fixed to the battery post, and the electric wire crimped to the battery terminal is held by the case of the fuse box. As a result, the case of the fuse box is fixed to the battery post.

Because the supporting plate is separately provided, it can be used for various kinds of batteries. Since the supporting plate is directly mounted on the battery, a chemical-resistant material is used for the supporting plate.

In a second embodiment of the invention, there is provided a fuse box mounting structure for electrically connecting a battery terminal fixed to a battery post, which projects from an upper surface of a battery, to a fuse housed within a fuse box that is mounted on the battery.

With this, a flat supporting plate, formed by molding an insulating resin, is interposed between the fuse box and the upper surface of the battery. A pair of through-holes are formed on the supporting plate to insert the battery post therein. An electric wire holding clip portion is projected from the supporting plate.

A circular arc portion of the battery terminal may be fixedly fitted on the battery post to thereby support the fuse box on the battery non-rotatably by fixing the battery terminal to the battery post and by fixing the electric wire extending outside of the fuse box to the clip portion.

In the first embodiment of the invention, the emboss portion of the supporting plate was fitted on the fit-on portion of the case of the fuse box to prevent rotation. In the second embodiment of the invention, the clip portion formed on the supporting plate locks the electric wire that extends from the fuse box to prevent rotation of the fuse box.

Needless to say, it is possible to adopt the construction of the first embodiment of the invention in which the emboss portion is fitted on the fit-on portion of the case of the fuse box and the construction of the second embodiment of the invention in which the clip portion locks the electric wire.

A plurality of ribs projects from a periphery of one through-hole, formed on the supporting plate, for the positive battery post so that the ribs press against either the positive battery post or a resinous portion surrounding the positive battery post when the positive battery post is inserted into the through-hole.

With this, when the battery post is inserted through the through-hole of the supporting plate, a plurality of the ribs formed projectingly inwardly from the periphery of the through-hole are pressed against the resinous portion surrounding the battery post or the base thereof. Thus, it is possible to prevent the supporting plate from loosening.

It is preferable that a plurality of the ribs project inwardly at regular intervals from the periphery of the through-hole.

A through-hole, formed on the supporting plate, for a positive battery post is circular, whereas a through-hole for a negative battery post is elliptic.

Since the negative battery post is elliptic, it has a sufficient width. Thus, even though the distance between the positive battery post and the negative battery post varies depending on the type of battery, the difference in the distance therebetween can be taken into account. Therefore, the supporting plate is applicable to various kinds of batteries.

A bus bar is fastened to a terminal of the fuse that is accommodated inside the fuse box and the bus bar is fastened to the battery terminal. The circular arc portion of the battery terminal is exposed to the outside from an opening of the fuse box to fixedly fit the circular arc portion on the battery post.

More specifically, the bus bar is fastened to the terminal projected from the fuse with a bolt so that the bus bar and the battery terminal overlap each other. The bus bar and the battery terminal circular arc are accommodated within the case of the fuse box. The circular arc portion of the battery terminal is fitted on the battery post and fastened by a bolt and nut. One end of the bus bar overlaps a pair of fastening pieces that project from both ends of the opening of the circular arc portion of the battery terminal, and fasten the bus bar to the battery terminal. That is, by fastening the battery terminal to the battery post, the fuse box is fixed to the battery.

BRIEF DESCRIPTION OF THE DRAWINGS

The foregoing and other features of the present invention will become apparent with reference to the accompanying drawings, wherein.

DETAILED DESCRIPTION OF PREFERRED EMBODIMENTS

Embodiments of the present invention will be described below with reference to the drawings.

Figure 1:
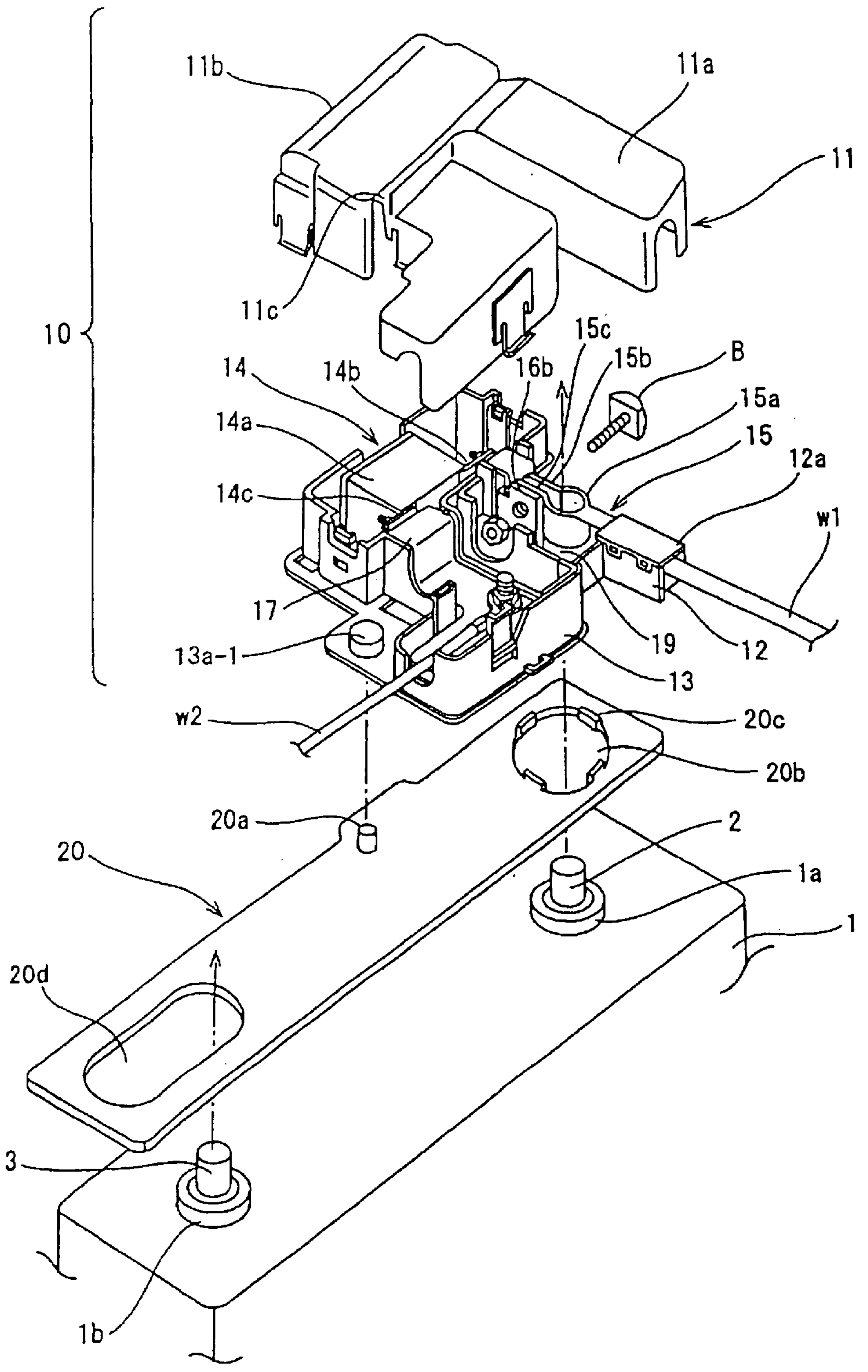
FIG. 1 is an exploded perspective view showing a fuse box-fixing construction according to a first embodiment of the present invention.
Figure 2:
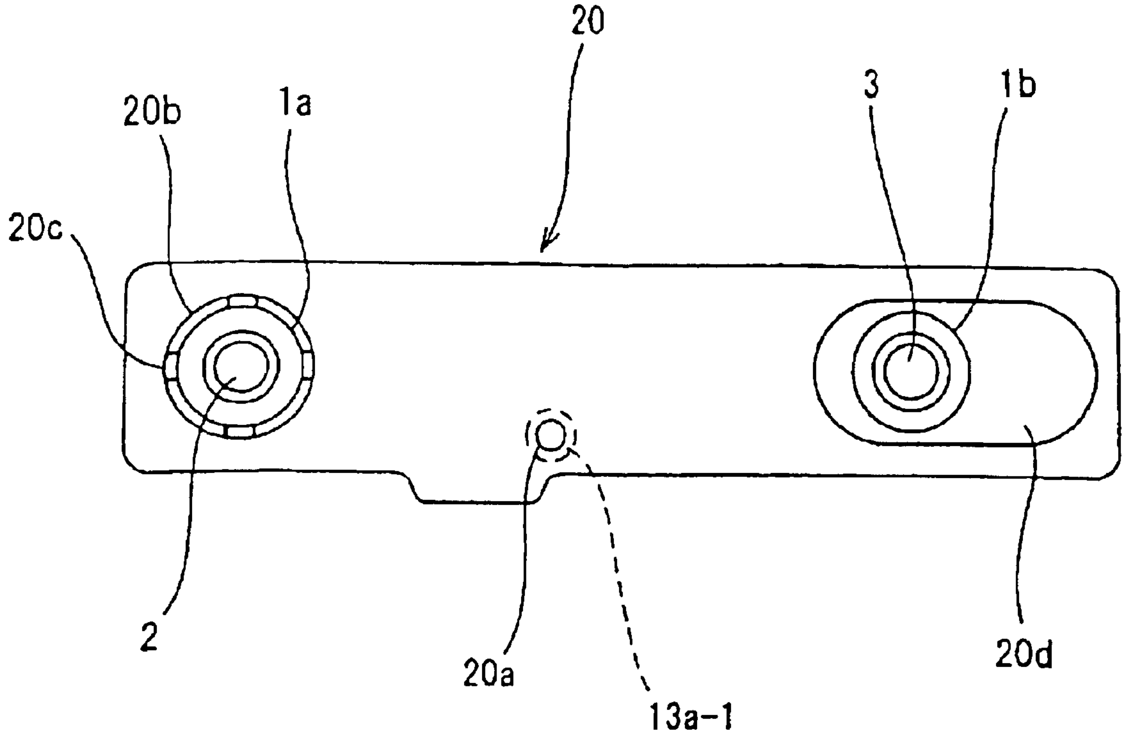
FIG. 2 is a schematic view showing a state in which a supporting plate is fixed.
Figure 3:
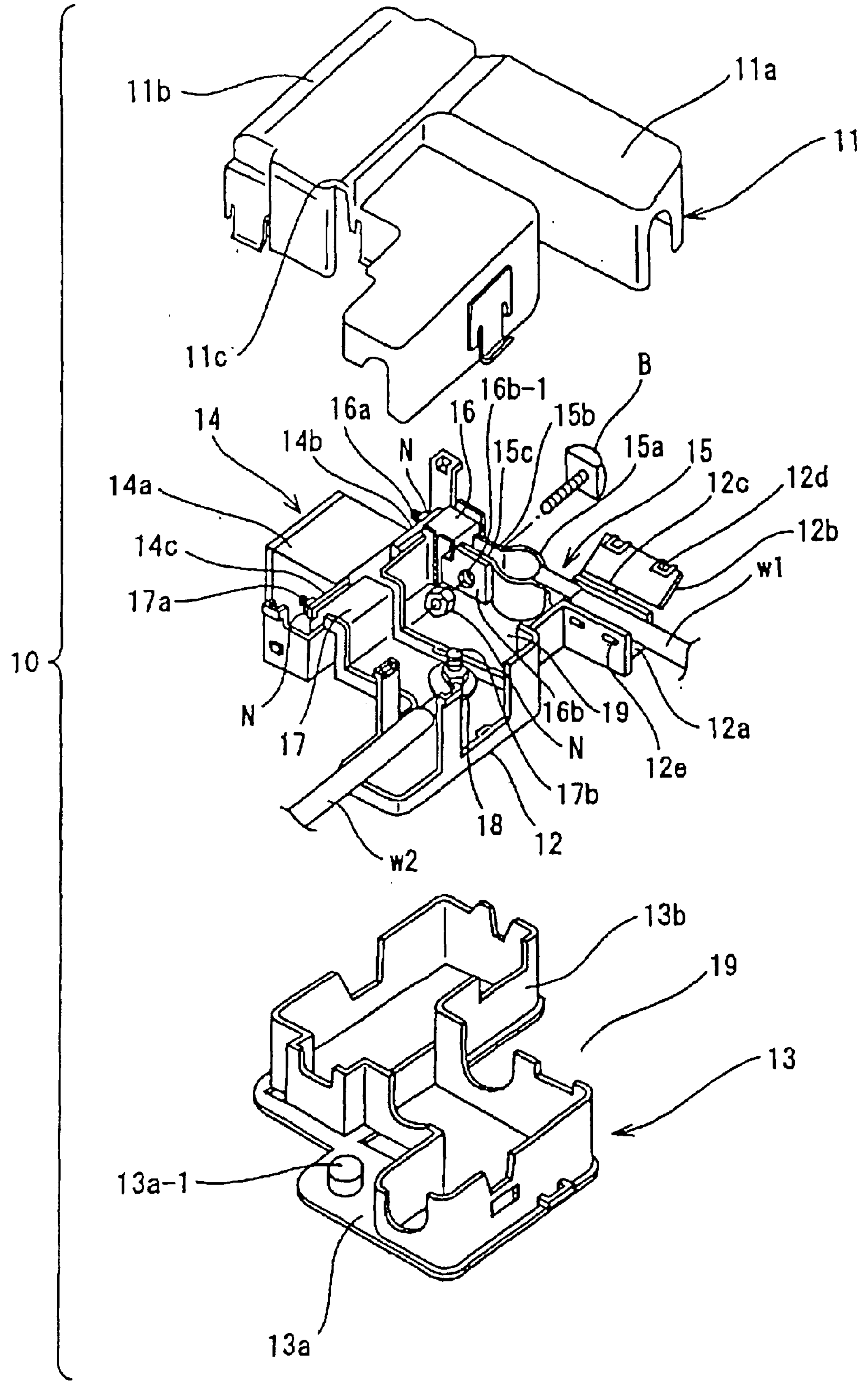
FIG. 3 is an exploded perspective view showing the fuse box.

FIGS. 1 through 3 show a fuse box mounting structure according to a first embodiment. A fuse box 10 is fixed to an upper surface of a battery box 1 mounted on a vehicle through a supporting plate 20.

As shown in FIG. 3, a case composed of the fuse box 10 includes a lower case 13, an upper case 11, and an intermediate case 12. The intermediate case 12 fixedly accommodates a battery fuse 14, an input-side bus bar 16 connected to a terminal of the battery fuse 14, and an output-side bus bar 17 also connected to the terminal of the battery fuse 14.

More specifically, one end of the input-side bus bar 16 overlaps an input terminal 14*b* that projects horizontally from one side of the bottom surface of body 14*a* of the battery fuse 14, and one end of the output-side bus bar 17 overlaps an output terminal 14*c* that projects horizontally from the other side of the bottom surface of body 14*a* of the battery fuse 14. Screw portions 16*a* and 17*a* project from the input-side bus bar 16 and the output-side bus bar 17, respectively, and penetrate through through-holes (not shown) of input terminals 10*b* (not shown) and output terminal 14*c*, respectively, and fixed with a nut N.

After the input-side bus bar and the output-side bus bar are accommodated in the intermediate case, it is possible to fasten the input-side bus bar to the input terminal of the battery fuse with a bolt and also fasten the output-side bus bar to the output terminal of the battery fuse.

After the intermediate case 12 accommodates the battery fuse 14, the input-side bus bar 16, and the output-side bus bar 17 fixedly, the intermediate case 12 is mounted on the lower case 13, and the upper case 11 is mounted on the lower case 13.

The intermediate case 12 directly contacts the input-side bus bar 16 and the output-side bus bar 17. Because both have a high calorific value, the intermediate case 12 is made of a heat-resistant resin. To minimize its use, the resin is used for only the portion of the intermediate case 12 that contacts the input-side bus bar 16 and the output-side bus bar 17. Each of the lower case 13 and the upper case 11 are made of an inexpensive synthetic resin. Considering that the supporting plate 20 is directly placed on the upper surface of the battery box 1, it is preferable that a chemical-resistant material is used for the supporting plate 20.

A flange portion 13*a* is formed perpendicular on the lower end of an accommodation portion 13*b* that accommodates the intermediate case 12 to form an inversely concave projected portion (fit-on portion) 13*a*-1 on the flange portion 13*a* at a predetermined position thereof.

In the upper case 11, one half serves as an opening/closing cover 11*a*. A hinge 11*c* is interposed between the opening/closing cover 11*a* and another half 11*b* locks to the lower case 13 to open and close the opening/closing cover 11*a*.

The battery terminal 15 has a projected circular arc portion 15*a* which is crimped to the tip of an electric wire w1 of a power circuit and fits on the periphery of the battery post 2. A fastening piece 15*b* projects from the tip of the circular arc portion 15*a* at one side, whereas a fastening piece 15*c* makes a pair with the fastening piece 15*b* and projects from the tip of the circular arc portion 15*a* at an opposing side. A bolt opening (not shown) is formed on each of the fastening pieces 15*b* and 15*c*.

With the electric wire w1 inserted into an electric wire accommodation portion 12*a* of the intermediate case 12, a lid portion 12*b* connects to a side wall of the electric wire accommodation portion 12*a* through a hinge portion 12*c*. The hinge portion 12*c* is closed to lock a locking frame 12*d* on a side of the lid portion 12*b* to a to-be-locked portion 12*e* on the side of the electric wire accommodation portion 12*a*. Thereby the electric wire w1 is held in the intermediate case 12.

An opening 19 is formed on the intermediate case 12 and the lower case 13 at a position thereof corresponding to the position of the circular arc portion 15*a*, of the battery terminal 15, that is exposed to the outside.

An opposing end portion of the input-side bus bar 16 is extended to a position where the opposing end portion overlaps the side of the tightening piece 15*c* to form a connection piece 16*b* through which a bolt opening 16*b*-1 communicates with the bolt opening (not shown) of the tightening pieces 15*b* and 15*c*.

A screw portion 17*b* projects upward from the upper surface of the output-side bus bar 17 at an intermediate position of the other side thereof. Thereby a terminal 18 disposed at an end of an electric wire w2 connects to a relay box (not shown) and is fastened with the nut N.

A circular through-hole 20*b* is formed at one side of an approximately rectangular flat plate composing the supporting plate 20, whereas an approximately elliptical through-hole 20*d* is formed at one side thereof. A columnar emboss portion 20*a* projects upward from a position disposed between the through-holes 20*b* and 20*d*. Four ribs 20*c* project inward from the periphery of the circular through-hole 20*b*.

Considering that the supporting plate 20 is directly placed on the upper surface of the battery box 1, a chemical-resistant material is used for the supporting plate 20.

The method of fixing the fuse box 10 to the battery box 1 is described below.

As shown in FIGS. 1 and 2, the positive battery post 2 is inserted through the through-hole 20*b* of the supporting plate 20, and the negative battery post 3 is inserted through the through-hole 20*d*.

The through-hole 20*d* is approximately elliptical. Thus, even though the distance between the battery posts 2 and 3 varies depending on the type of battery, the difference in the distance therebetween can be absorbed.

Four ribs 20*c* are formed projectingly inwardly from the periphery of the circular through-hole 20*b*. Because the positive battery post is pressed against a resinous portion 1*a* surrounding the base of the positive battery post 2 when the positive battery post 2 is fitted on the through-hole 20*b*, it is possible to prevent the supporting plate 20 from loosening.

In this state, the circular arc portion 15*a* of the battery terminal 15 is fitted on the positive battery post 2 that projects upward from the through-hole 20*b* of the supporting plate 20. With the bolt openings (not shown) of the fastening pieces 15*b*, 15*c* and the bolt opening 16*b*-1 of the connection piece 16*b* of the input-side bus bar 16 overlapping each other, the bolt B is inserted through the bolt openings and clamped with the nut N. Thereby the circular arc portion 15*a* fits on the periphery of the positive battery post 2. In this operation, the battery and the battery fuse 14 are electrically connected to each other, and the fuse box 10 is fixed to the battery box 1. Then the opening/closing lid 11*a* of the upper case 11 is closed to lock the upper case 11 to the lower case 13.

The emboss portion 20*a* of the supporting plate 20 is inserted upward into a projected portion 13*a*-1 formed on a flange portion 13*a* of the lower case 13 of the fuse box 10.

Thereby, the fuse box 10 is placed in position by fixing the circular arc portion 15*a* of the battery terminal 15 to the positive battery post 2 and by fixing the emboss portion 20*a* of the supporting plate 20 to the projected portion 13*a*-1. Therefore, it is possible to prevent the fuse box 10 from rotating and turning in a wrong direction on the positive battery post 2.

Accordingly, the fuse box 10 can be mounted on a vehicle body with high operability, and the electric wires w1, w2 extending from the fuse box 10 can be connected to apparatuses with high operability.

Because the fuse box 10 is directly installed on the battery box 10, it is possible to reduce the space needed for installing the fuse box 10, although the space for installing the fuse box 10 is required in the conventional art. Thus, it is possible to effectively utilize a limited wiring space in a vehicle body. In electrically connecting the battery fuse inside the fuse box 10 and the battery post 2 to each other, the circular arc portion 15*a* of the battery terminal 15 is fitted on the positive battery post 2 not through the lead wire but through the battery terminal 15. Thus, it is possible to improve reliability of the electric connection.

Because the battery fuse 14 is accommodated lengthwise inside the fuse box 10, the height of the fuse box 10 can be small. Thus, it is possible to secure a clearance between the fuse box 10 disposed on the upper surface of the battery box 1 and a bonnet (not shown).

Instead of the separate supporting plate, it is possible to provide the emboss portion on a battery-supporting stay (not shown).

Figure 4:
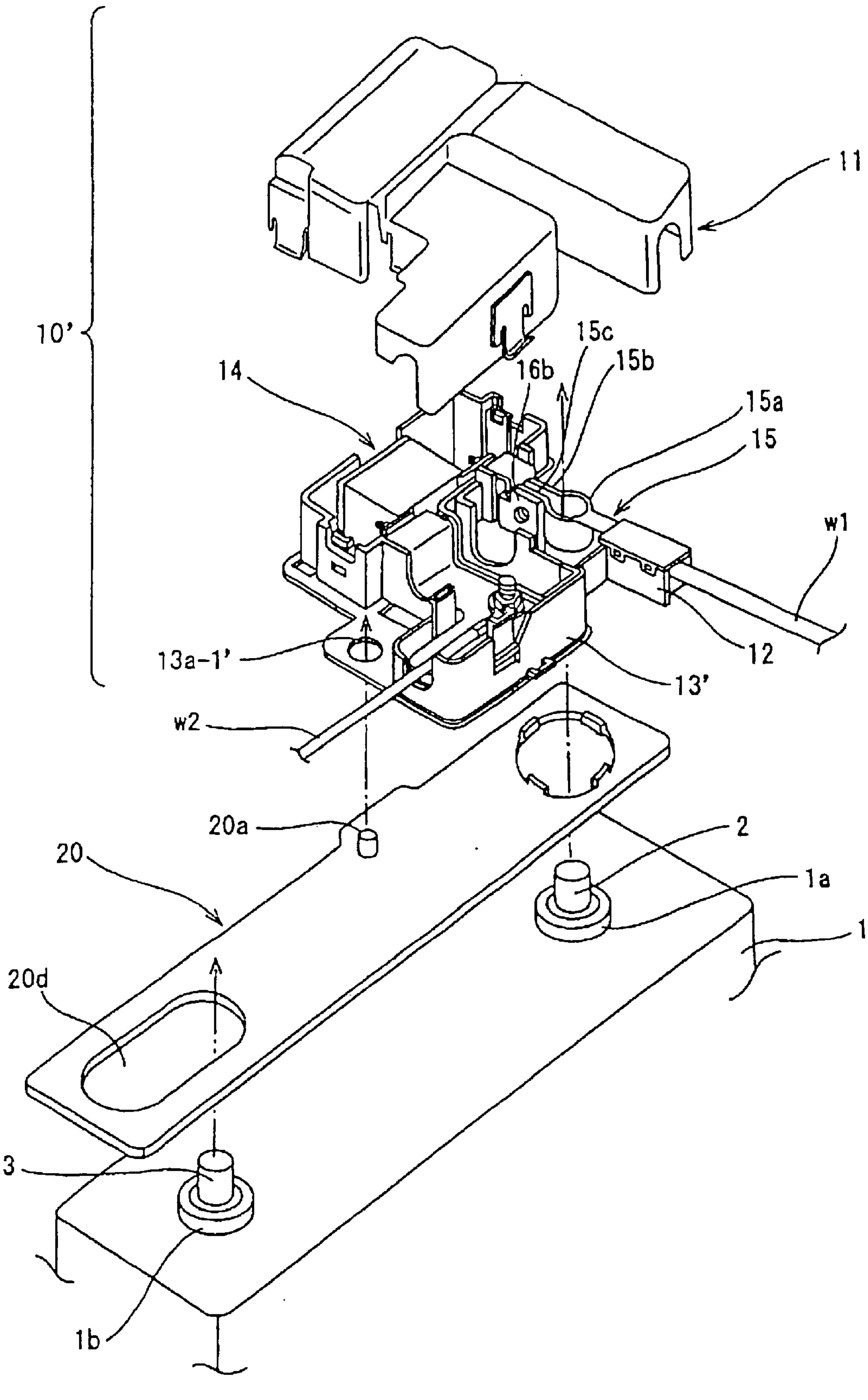
FIG. 4 is an exploded perspective view showing a fuse box-fixing construction according to a second embodiment of the present invention.

FIG. 4 shows a second embodiment different from the first embodiment in that instead of the projected portion 13*a*-1 (to-be-fitted portion), a fit-on opening 13*a*-1' is formed.

The fuse box is fitted to the battery in the same manner as in the first embodiment except that an emboss portion 20*a* of the supporting plate 20 is inserted into the fit-in opening 13*a*-1' of the lower case 13.

Thereby, the fuse box 10' is placed in position by the fixing of the positive battery post 2 to the circular arc portion 15*a* of the battery terminal 15 and the fixing of the emboss portion 20*a* of the supporting plate 20 to the fit-on opening 13*a*-1'. Therefore it is possible to prevent the fuse box 10 from rotating and turning in a wrong direction on the positive battery post 2.

Because other aspects of the second embodiment are similar to those of the first embodiment, description thereof is omitted herein.

Figure 5:
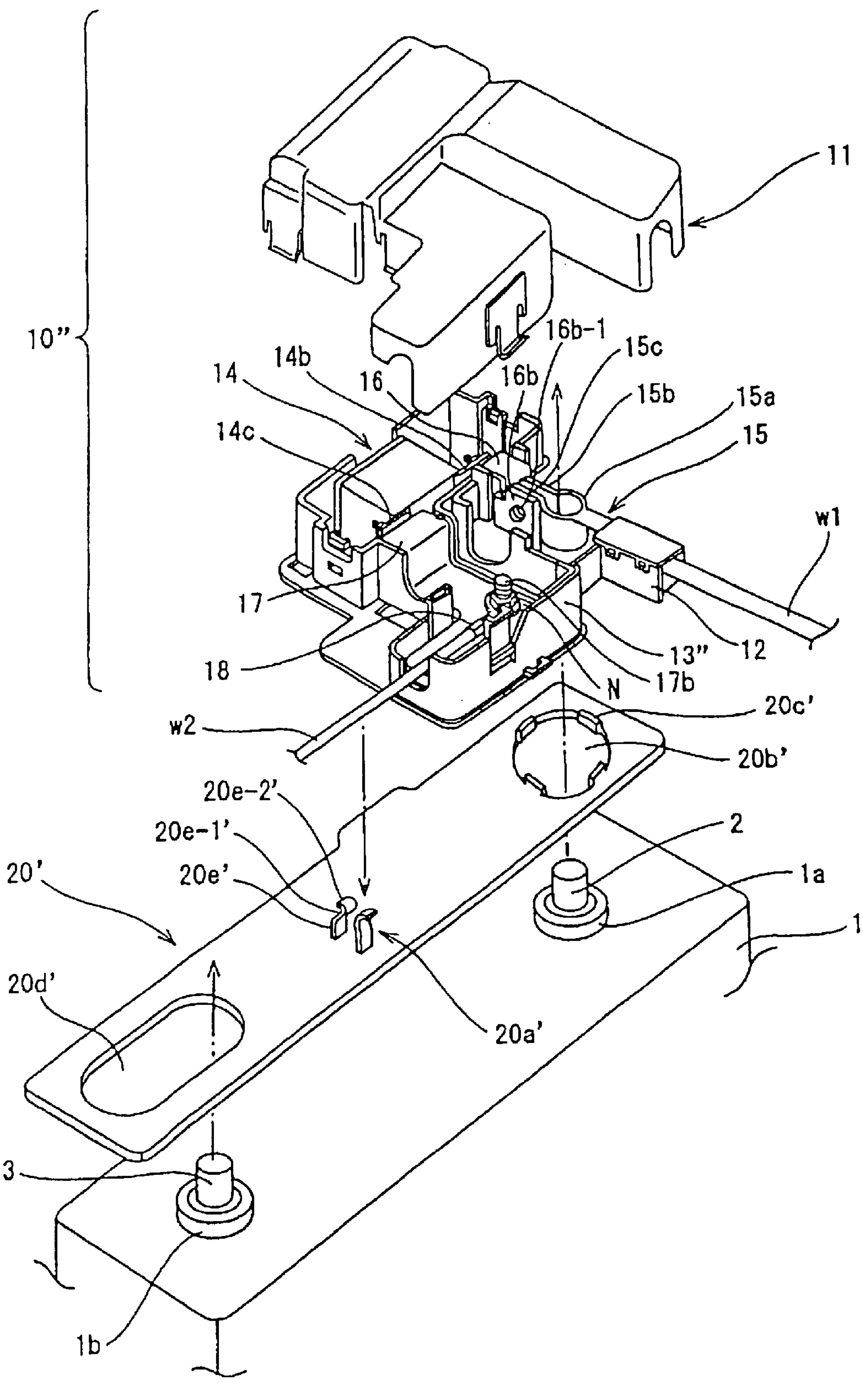
FIG. 5 is an exploded perspective view showing a fuse box-fixing construction according to a third embodiment of the present invention.
Figure 6:
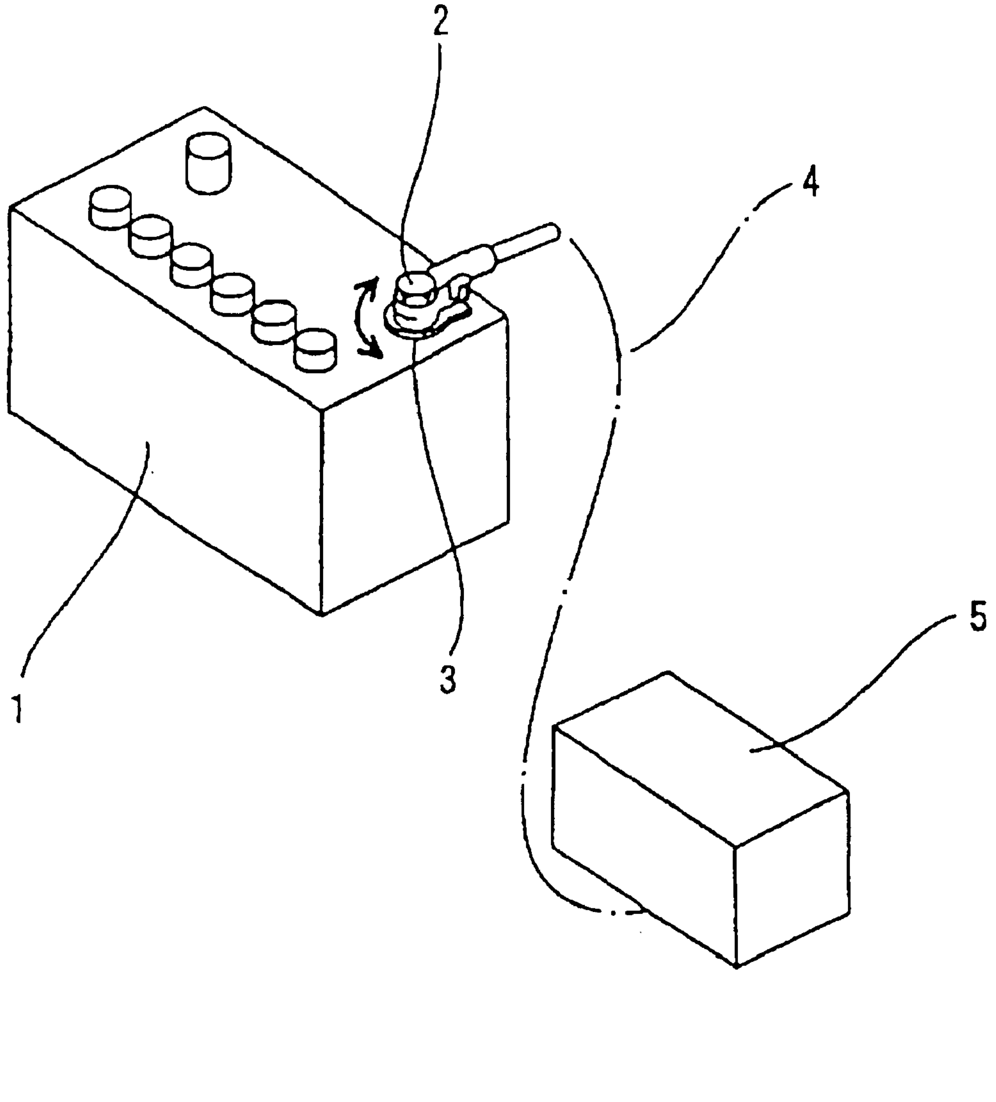
Fig. 6 RELATED ART
FIG. 6 shows a conventional art.

FIG. 5 shows a third embodiment different from the first embodiment in that a supporting plate 20' is provided not with an emboss portion, but instead with a clip portion 20*a*'.

The clip portion 20' projects upward from a position disposed between a circular through-holes 20*b*' and an elliptic through-hole 20*d*'.

The clip portion 20' includes a pair of wavy pieces 20*e*'. Each wavy piece 20*e*' has a proximate portion 20*e*-1' narrower than the diameter of an electric wire and a move-away portion 20*e*-2' disposed at the tip thereof.

An electric wire w2 extended from a fuse box 10" is pressed into the clip portion 20*a* from the move-away portion 20*e*-2' by flexing the proximate portion 20*e*-1' in a move-away direction. Thereby, the electric wire w2 is held between the wavy pieces 20*e*'.

With this, it is possible to restrict the direction of the electric wire 2 without providing a lower case 13" with a projected portion or a fit-on portion. That is, the fuse box 10" is placed in position by the fixing of the positive battery post 2 to the circular arc portion 15*a* of the battery terminal 15 and by the fixing of the electric wire w2 to the clip portion 20*a*' of the supporting plate 20'. Therefore, it is possible to prevent the fuse box 10" from rotating on the positive battery post 2 and turning in a wrong direction.

Accordingly, the fuse box 10" can be mounted on a vehicle body with high operability, and the electric wires w1, w2 extending from the fuse box 10" can be connected to apparatuses with high operability.

The configuration of the clip portion is not limited to the above-described embodiment, but instead anything that locks the electric wire w2 (or w1) and the fuse box thereto can be adopted.

A three-point holding of the fuse box can be adopted by using the fixing by means of the emboss portion of the first embodiment and the fixing by means of the clip portion of the third embodiment.

Because other aspects of the third embodiment are similar to those of the first embodiment, description thereof is omitted herein.

Because the fuse box is directly installed on the battery box, it is possible to accomplish space-saving. Further the battery fuse and the battery post are connected to each other not through the lead wire but through the battery terminal. Thus it is possible to improve reliability on the electric connection.

What is claimed is:

1. A fuse box mounting structure for electrically connecting a fuse box to a connection of a battery terminal and a battery post of a battery and also supporting the fuse box, comprising:

a supporting plate having a pair of through holes for accommodating battery posts of the battery, and the supporting plate further including a positioning emboss portion for fixing the fuse box in a predetermined orientation on the support plate; and the fuse box having a connection piece that electrically connects and rigidly fixes the fuse box to the connection made by the battery terminal and the battery;

whereby the fuse box is non-rotatably attached via the connection piece and the positioning emboss portion, and the positioning emboss fits on a portion formed on a bottom wall of a casing of the fusebox.

2. The fuse box mounting structure according to claim 1, wherein the fuse box has an intermediate case for housing the wire of the battery terminal.

3. The fuse box mounting structure according to claim 1, wherein one of the pair of through holes has a plurality of ribs projecting from the periphery of the through hole to provide a press fit with the battery post.

4. The fuse box mounting structure according to claim 1, wherein one of the pair of through holes is elliptical in shape to accommodate a battery post of different types of batteries.

5. The fuse box-fixing construction according to claim 1, wherein a bus bar is housed within the fuse box and is fastened to the battery terminal, and the battery terminal is housed outside of the fuse box.

6. A fuse box mounting structure for electrically connecting a fuse box to a connection of a battery terminal and a battery post of a battery and also supporting the fuse box comprising:

a flat supporting plate fanned of insulating resin interposed between the fuse box and the battery;

a pair of through-holes formed on the supporting plate to insert the battery post therein;

a holding clip projecting from the supporting plate;

a fuse box connection piece that electrically connects and rigidly fixes the fuse box to the connection made by the battery terminal and the battery; and a wire extending from the fuse box that is retained on the holding clip;

wherein the fuse box is non-rotatably attached via the connection piece and the coupling of the wire and the holding clip.

7. The fuse box mounting structure according to claim 6, wherein the fuse box has a case for housing the wire of the battery terminal.

8. The fuse box mounting structure according to claim 6, wherein one of the pair of through holes has a plurality of ribs projecting from the periphery of the one through hole to provide a press fit with the battery post.

9. The fuse box mounting structure according to claim 6, wherein one of the pair of through holes is elliptical in shape to accommodate a battery post of different types of batteries.

10. The fuse box mounting structure according to claim 6, wherein a bus bar is housed within the fuse box and is fastened to the battery terminal, and the battery terminal is housed outside of the fuse box.

* * * * *